June 26, 1956     T. C. DONNAHUE     2,751,635

PORTABLE PREFABRICATED SHELTER

Filed March 9, 1950     5 Sheets—Sheet 1

Inventor
Thomas C. Donnahue

By
ATTORNEY

June 26, 1956     T. C. DONNAHUE     2,751,635
PORTABLE PREFABRICATED SHELTER
Filed March 9, 1950     5 Sheets-Sheet 2
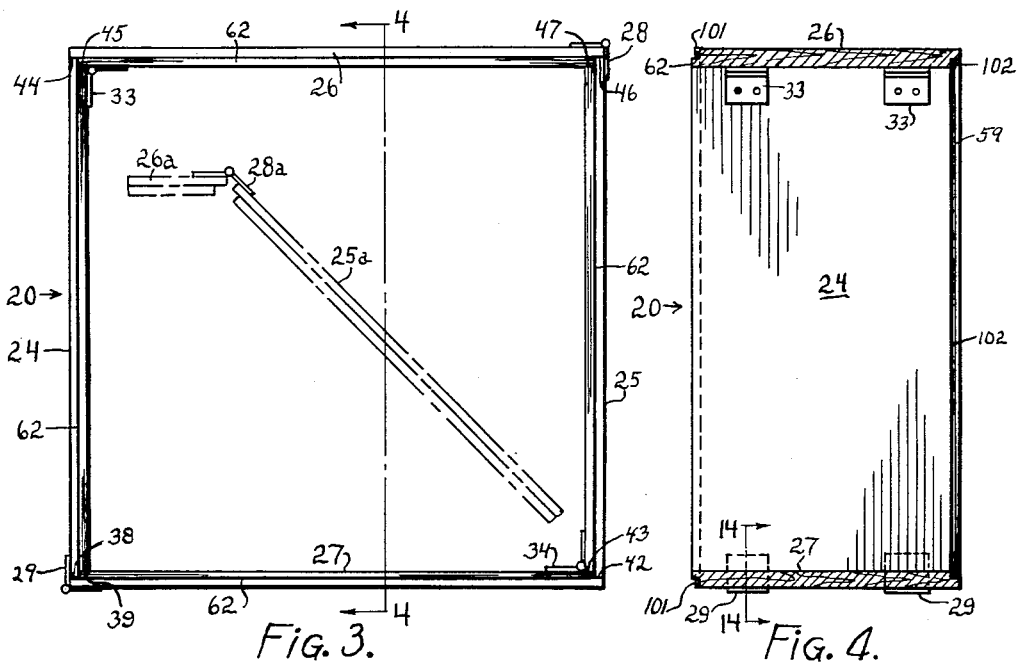
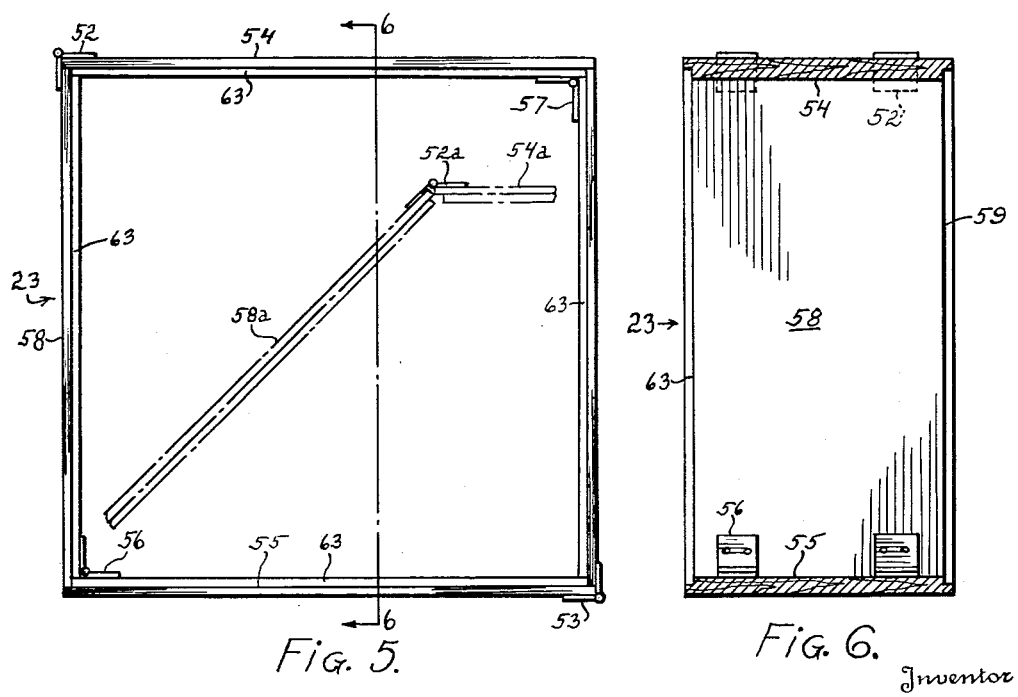
Inventor
Thomas C. Donnahue
D.B. Snyder
Attorney June 26, 1956     T. C. DONNAHUE     2,751,635
PORTABLE PREFABRICATED SHELTER
Filed March 9, 1950     5 Sheets—Sheet 3
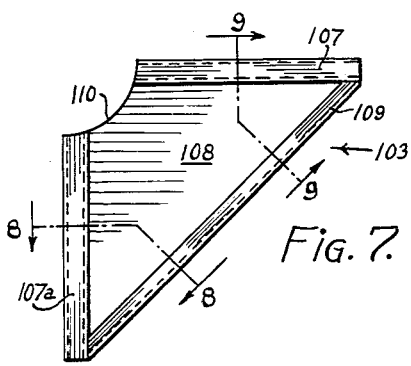
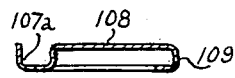
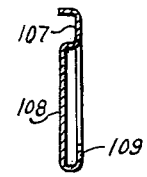
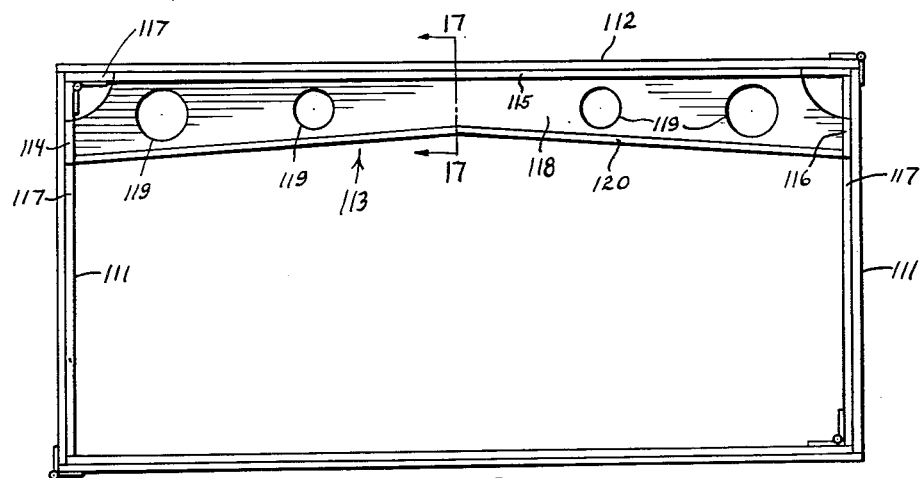
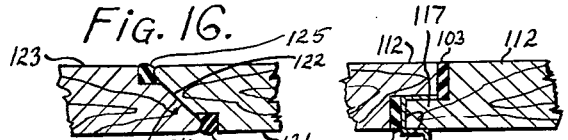
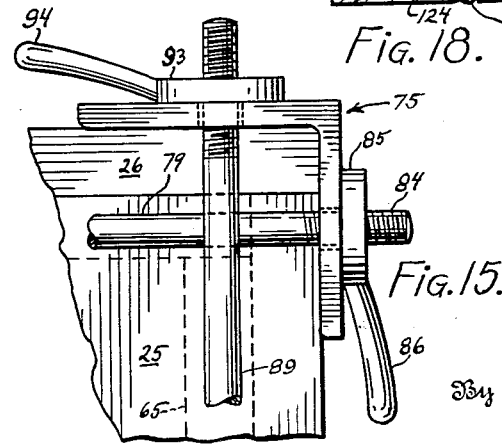
Inventor
Thomas C. Donnahue Inventor
Thomas C. Donnahue
By
Attorney June 26, 1956     T. C. DONNAHUE     2,751,635
PORTABLE PREFABRICATED SHELTER
Filed March 9, 1950     5 Sheets-Sheet 5
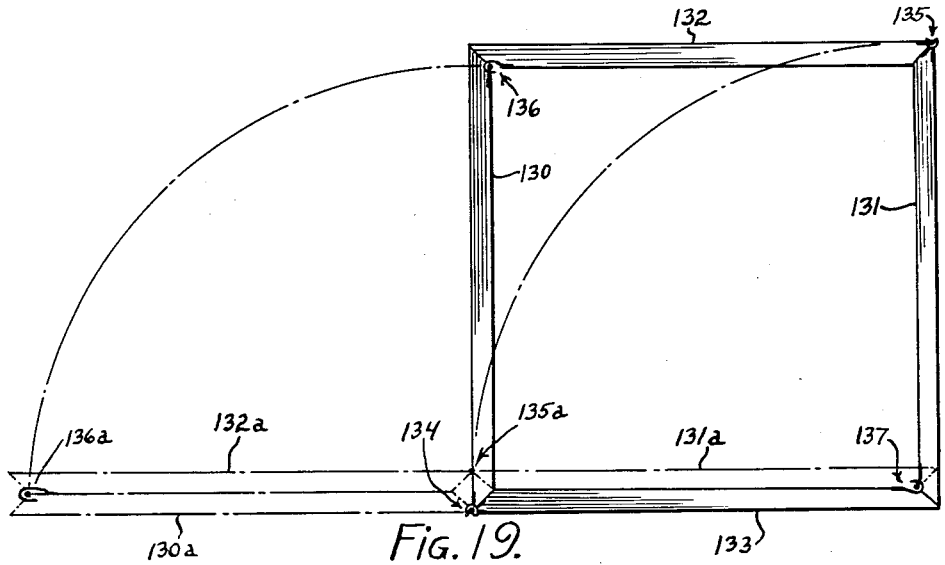
Fig. 19.
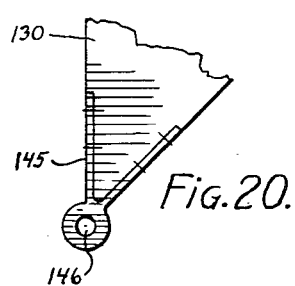
Fig. 20.
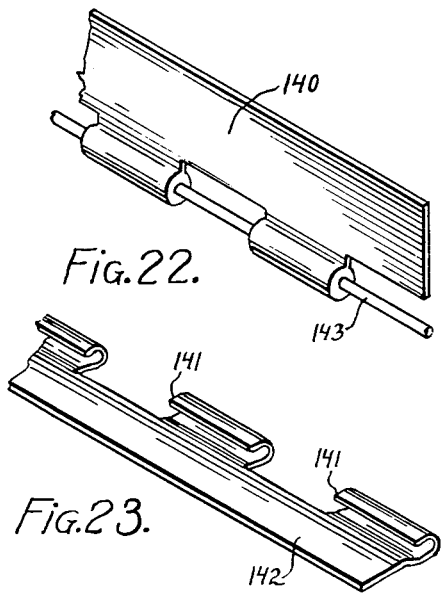
Fig. 22.
Fig. 23.
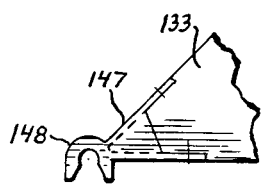
Fig. 21.
Inventor
Thomas C. Donnahue
By
D. C. Snyder
ATTORNEY 2,751,635
PORTABLE PREFABRICATED SHELTER Thomas C. Donnahue, Alexandria, Va.

Application March 9, 1950, Serial No. 148,680

4 Claims. (Cl. 20—2)

(Granted under Title 35, U. S. Code (1952), sec. 266)

This invention relates to the construction of prefabricated shelters or buildings for housing personnel or equipment, and in particular to a shelter that can be erected or dismantled in a minimum time even under very adverse weather conditions.

The term prefabricated is usually applied to shelters that have at least some of their component parts constructed and assembled at a factory so that the amount of cutting and fitting at the erection site is materially reduced. Generally, the primary purpose of such prefabricated structures is the reduction of cost that follows assembly line production. A pleasing appearance of the finished shelter is usually desired, and this consideration has a definite effect in determining the amount of prefabrication that may be attempted. Also, it is seldom that the flooring forms part of the prefabricated structure since at least in prefabricated shelters intended for residences, the foundation and floor are constructed at the selected site.

The present invention relates to prefabricated shelters that, as far as the "shell" is concerned, is entirely prefabricated and does not require the use of even a hammer or saw for its erection. It is intended primarily for the use of shore based naval forces, expeditionary forces, or exploration parties, etc., particularly for use in the Arctic or Antarctic, although it is to be understood that its particular advantages for these specific purposes does not preclude the employment of its principles for other useful purposes, as for example, hunting or fishing cabins, construction "shacks" or the like.

When personnel are transported to cold climates for the purpose of establishing bases for any desired purpose it is a primary object to set up housing for shelter from the elements as soon as possible because they cannot long function without protection for themselves and their equipment. Until such shelter is set up the personnel have to operate from whatever conveyance took them to their destination. Usually they are taken to Arctic or Antarctic outposts by ship, in which case the only shelter that they have is the ship itself until the camp buildings are erected. In such climates the erection of buildings by prior known construction is a difficult operation under the prevailing conditions of extreme cold and high winds. In the case of a building construction in accordance with one illustrated embodiment of my invention, where the building comprises sections having 4 x 8 foot floor panels and a ceiling height of 8 feet, a six section building, having a floor area of 8 x 24 feet, can be completely erected by an inexperienced crew of six men in from 24 to 30 minutes. With a crew of four men the erection time is approximately 50% longer. When completed, the building is as strong and rigid as any wooden building of any conventional construction. It may be dismantled in less time than it takes to erect it.

It is therefore a primary object of my invention to provide a new and improved system of prefabricated building construction.

Another object of my invention is to provide a new and improved system of building construction employing hinged panels to form sections of the building.

Another important object is the provision of a prefabricated building construction wherein adjacent interlocking sections formed of hinged panels cooperate to hold each other in erected position.

It is still another object to provide a prefabricated building having interlocking sections maintained in cooperating relationship by means of adjustable tension elements.

Other objects will become apparent as the description proceeds in connection with the accompanying drawings, wherein:

Figure 3 is a view in end elevation of the rightmost building section of Figure 1.

Figure 4 is a vertical sectional view along the line 4—4 of Figure 3.

Figure 5 is a view in end elevation of the leftmost building section of Figure 1.

Figure 6 is a vertical sectional view along the line 6—6 of Figure 5.

Figure 7 is a view in front elevation of one of the knee braces shown in perspective in Figure 2.

Figure 8 is a sectional view through the knee brace substantially along the line 8—8 of Figure 7.

Figure 9 is a sectional view through the knee brace substantially along the line 9—9 of Figure 7.

Figure 15 is a view showing in enlarged detail the fastenings at the upper right corner of the building of Figure 1.

Figure 16 is a view looking toward the open end of an erected building section differing from that of Figure 3 only in that the roof span is approximately twice that of Figure 3, and wherein a roof truss extending the full width of the roof is substituted for the knee braces of Figures 2 and 7.

Figure 17 is an enlarged sectional view along the line 17—17 of Figure 16, looking in the direction of the arrows, but omitting details not in the plane of the section.

Figure 18 is an enlarged sectional view showing in detail another form of interlocking joint between adjacent building sections.

Figure 19 is a view in end elevation of a section having another form of edge and hinge construction.

Figures 20 and 21 are enlarged side elevations of separable external hinge elements shown in Figure 19.

Figures 22 and 23 are enlarged side elevations of separable internal hinge elements shown in Figure 19.

Figure 1:
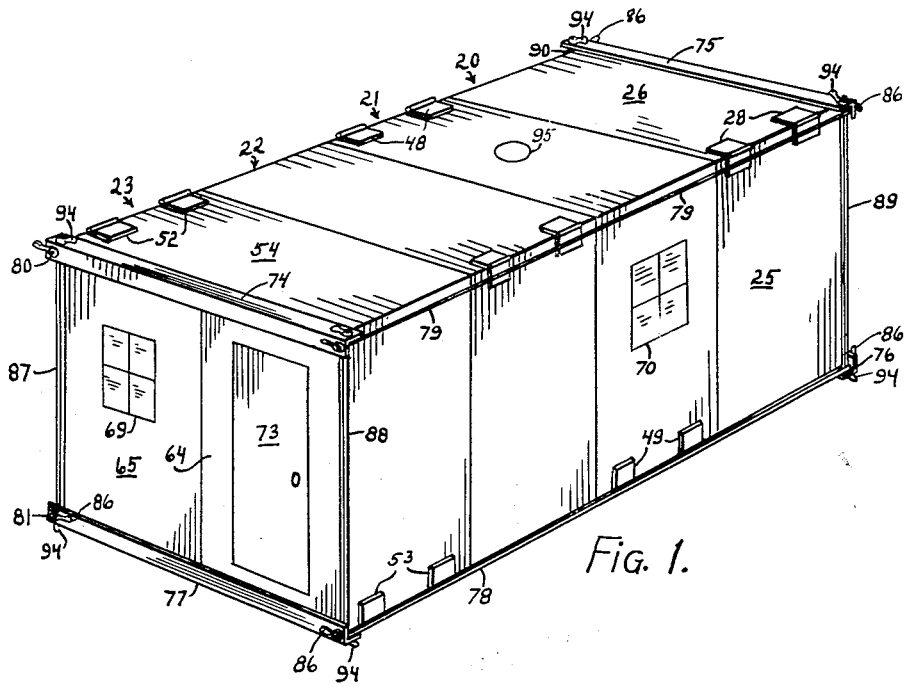
Figure 1 is a perspective view of an assembled building illustrating a preferred embodiment of my invention.

Referring to Figure 1 where a completely erected shelter, built in accordance with a preferred embodiment of the invention, is shown, the building has four sections indicated generally by the reference numbers 20, 21, 22 and 23.

Figure 2:
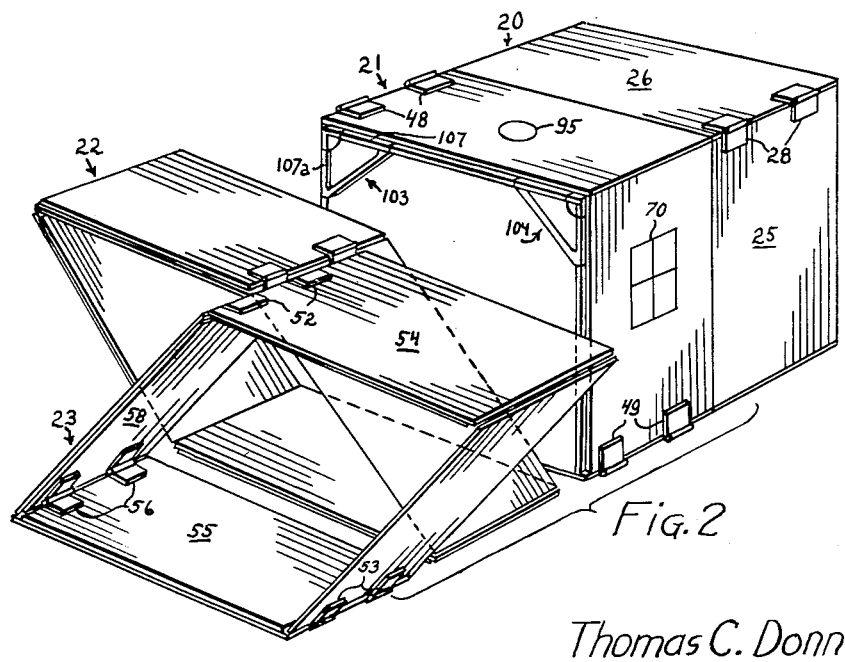
Figure 2 is a view of the building shown in Figure 1, but during an intermediate stage of its erection.

As best shown in Figures 2, 3 and 5, each section comprises vertical side panels and top and bottom panels joined by hinges at the corners. Section 20 has side panels 24 and 25, top panel 26 and bottom panel 27. Referring to Figure 3 is will be seen that the hinges at the four corners where the panels are joined are so arranged that the section 20 may be collapsed to a flattened condition, or squared to the erected position of Figure 3. Thus there are external hinges 28 at the upper right hand corner of the section 20, joining the top panel 26 to the side panel 25. At the diagonally opposite corner are external hinges 29 joining the bottom panel 27 to the side panel 24. At the other two remaining corners the panels are joined by internal sets of hinges 32 and 33 (Figs. 3 and 4). The hinges are secured to the panels in any suitable manner as by screws 31 (Fig. 14) or by through bolts.

Figure 14:
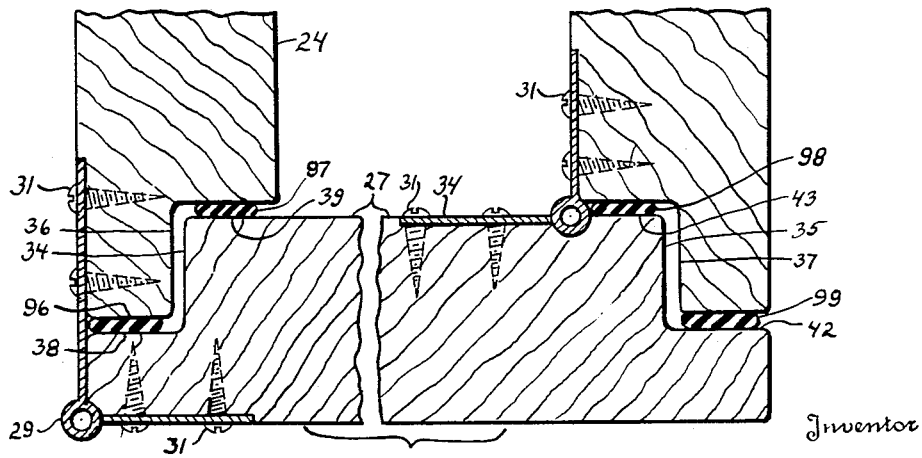
Figure 14 is an enlarged detail sectional view of the hinged joints between the bottom panel and the connected side panels of the rightmost building section, taken substantially along the line 14—14 of Figure 4.

The mating edges of the panels, where they are connected by the hinges, are stepped (or beveled as shown in Figures 18 and 19) for a purpose to be described. Referring to Figure 14 it will be seen that the lower panel 27 is provided with recesses 34 and 35 along its end edges. In a similar manner the bottom edges of the side panels 24 and 25 are provided with recesses 36 and 37. The result is that at its lower left hand corner as seen in Figure 14, there are abutments 38 and 39 on the left edge of floor panel 27 which limit the rotation of side panel 24 in a clockwise direction so that it cannot rotate beyond the vertical position in which it is shown in Figure 3 and 14. However it is free to rotate in the other direction so that side panel 24 is coplanar with bottom panel 27.

At the right hand hinged joint, between floor panel 27 and side panel 25 the floor panel has abutments 42 and 43 which limit the rotation of side panel 25 in a clockwise direction so that it cannot rotate beyond the vertical position in which it is shown in Figures 3 and 14. However it is free to rotate in the other direction until side panel 25 overlies bottom panel 27 in parallel disposition.

The construction at the top of the section is identical to that at the bottom except that as is apparent from Figure 3 the upper left hand hinges 33 are internal, and the upper right hand hinges 28 are external. Thus the abutments 44, 45, 46 and 47 (Figure 3) on the top panel 26 also prevent movement of the panels in one direction beyond the perpendicular positions shown in Figure 3, but permit collapse of the entire section in the other direction, so that when shipping the section, panels 26 and 25 will overlie and rest upon panels 24 and 27 respectively. In Figure 3 the panels 25 and 26 are shown in a semi-collapsed position in dot-dash lines at 25a and 26a. This is the only direction that the panels of section 20 can be rotated to collapse the section, and without anything else to hold them erected they can readily collapse in this direction.

All the rest of the sections are constructed identically to section 20, except for the disposition of the hinges at the joints, and one other slight modification in the leftmost section of Figures 1 and 2, which is normally the last section to be erected and joined to the others. If the completed shelter is to have more than two sections, then the third, fifth, etc., sections will be identical with the rightmost or first erected section in that the disposition of the hinges of these spaced sections will be exactly the same. Thus, in the illustrated shelter of Figures 1 and 2 the sections numbered 20 and 22 are identical. The only difference in section 21 is that the relative locations of its hinges are reversed from the locations of the hinges in sections 20 and 22. The sets 48 and 49 of external hinges of the section 21 are at the opposite ends of the top and bottom panels than are the external hinges of section 20. Similarly, the sets of internal hinges (not shown) of section 21 are at the opposite ends of the top and bottom panels than are the internal hinges of section 20.

The hinges of section 21 are in fact disposed exactly in the same manner as those of the fourth section 23, which are shown in Figures 2 and 5. The sets 52 and 53 of external hinges are at the opposite ends of the top and bottom panels than the hinges in sections 20 and 22, and the sets 56 and 57 of internal hinges are located at the remaining two diagonally opposite corners. For this reason sections 21 and 23 can be collapsed only by clockwise rotation of their side panels, or in the opposite direction to the direction of collapse of sections 20 and 22. A partially collapsed condition of section 23 is indicated by the dot-dash showing of top and side panels 54 and 58 at 54a and 58a in Figure 5.

In accordance with my invention, although any individual section can collapse in one direction, when two sections such as 20 and 21 with dissimilar hinge arrangements are interlocked with each other in a manner to be described, each prevents the collapse of the other, and the assembly of two or more sections becomes a rigid noncollapsible shelter having top, bottom, and two side walls.

The rightmost end of each of the panels forming a section is constructed in the same manner in that when erected there is a continuous inner peripheral recess or female connection 59 (Figures 4 and 5). The leftmost end of each of the sections except the last section 23 is formed with a continuous projection or male connection 62. When any two sections such as 20 and 21 have been erected and then are pushed together the projection 62 on section 20 will slip into the recess 59 on the section 21, so that the two sections will have a telescoped engagement at their adjoining edges. Thus, even without any other structural element the two telescoped or interlocked sections effectively support each other in erected position.

Any desired number of sections can be interconnected to form a shelter of convenient or desired length. The arrangement of sections should always be such that any two sections that collapse in the same direction are separated by a section that collapses in the other direction, because one of the principal factors influencing the rigidity of the completed shelter is the coaction between adjacent sections in maintaining each other erected.

After all of the sections have been erected and telescoped in the manner described the end closures should be inserted. As will become apparent, these end closures cooperate with their respective sections to contribute to the rigidity of the shelter. Referring to Figure 6, the left end of the leftmost section 23, which is normally the last section to be erected, has a continuous inner recess 63 that is preferably of the same dimensions as those of the recesses 59 on the other ends of the sections. The shelter now has a recess 63 at one end and a recess 59 of the same size at the other end.

The closures for each end preferably comprise a pair of mating panels 64 and 65 (Figs. 1 and 10 to 13) one of which, say panel 65, has an overlapping engagement with panel 64 by means of a projection 66 on panel 65 that fits into a recess 67 on panel 64. Panels 64 and 65 are of such overall height and width that they slip snugly into the recess 63 of section 23 or the recess 59 of section 20, and they have (when assembled together) a peripheral recess 68 enabling their inner surfaces to project into the space between the inner surfaces of the section panels, thus providing throughout their periphery an overlapping engagement similar to the engagement between side and top panels as shown in Figure 14.

Certain of the vertical panels are provided with windows such as shown in Figure 1 at 69 and 70 and other panels are provided with doors such as shown at 73. The details of construction of the panels forming the shelter such as the materials of which they are made, and the manner in which they are built up to have the necessary panel strength, as well as the manner of building the windows and doors or other openings into the panels, do not form any part of this invention, since any suitable form of construction may be used for such details.

The assembled sections and end closures are maintained in assembled relationship in any suitable manner, but a preferred system is shown pictorially in Figure 1 and in partial detail in Figure 15. Angle iron members 74, 75, 76 and 77 are arranged at the upper and lower corners of the shelter at each end. These members are of such length that they protrude beyond the sides of the shelter as best shown in Figure 1. One leg of each member extends vertically downwardly or upwardly as the case may be, and overlaps the top or bottom of the panels 64 and 65 forming the end closures.

Four longitudinal tension bars or tie rods 78, 79, 80 and 81 extend along the longitudinal corners of the shelter, each bar passing through openings in the vertical legs of the angle bars. In Figure 1 only the left ends of the bars 80 and 81 are visible. The ends of each bar are threaded as indicated at 84 in Figure 15, and cooperating threaded elements which may be in the form of nuts 85 having integral handles 86 are threaded over the ends of the bars. When the nuts 85 are tightened the bars are tensioned and thus pull the telescoped sections tightly into abutting and telescoped relationship. Care should be taken to tension the bars substantially equally and at the same rate.

At the four vertical corners of the shelter are arranged four vertical tie rods 87, 88, 89 and 90, only the upper end of rod 90 being visible in Figure 1. These vertical tie rods are also threaded at each end, and pass through the horizontal legs of the angle iron members 74 to 77, being tensioned as by cooperating nuts 93 (Fig. 15) having integral handles 94. The shell of the shelter is thus held tightly within a framework of tensioned longitudinal and vertical members and rigid angle iron members that compress the end closure panels against their seats as well as compressing the abutting telescoped sections together.

The shelter is now completely finished and ready for occupancy or for storage purposes. Since ventilators and a smoke stack will normally be required, openings through certain of the panels to accommodate them will normally have been provided in the panel while it was being prefabricated, and in the case of ventilators or the like they can be of such design as to be built into the panel. If an opening for a smoke stack has been provided it may be sealed by a temporary and removable closure indicated at 95 in Figures 1 and 2.

Where it is desired that the shelter be weatherproof, resilient gaskets or weatherstrips are installed at the factory to form part of the prefabricated structure. Figure 14 shows such resilient gaskets at the hinged panel joints. Two resilient gaskets 96 and 97 of rubber or the like are indicated at the left hand joint. These gaskets are cemented or otherwise secured either to the edges of panel 24 or to the surfaces of the abutments 38 and 39 on panel 27. Similar gaskets 98 and 99 are located at the other hinged joint, also affixed to either panel 25 or 27. Identical gaskets are provided at the top hinged joints of each section, it being understood that all gaskets run the full length of each hinged joint. It should be explained here that if no gaskets are to be used there will not be any space provided for them as shown in Figure 14. Instead, the abutments such as 38 and 39, for example, will directly engage the mating edge portions of panel 24.

Resilient gaskets are also provided at the telescoping joints of adjacent sections. As shown in Figure 4 a gasket 101 is secured to the left edges of the panels, surrounding the projection or male connection 62. A similar gasket 102 lies within the recess formed by the other edges of the panels. When the shelter has been assembled and the four longitudinal tension bars 78—81 are tightened these resilient gaskets 101 and 102 at the telescoped joints are compressed and form an effective seal. These gaskets are similar to and located in the same manner as the gaskets 100 and 103 shown in the enlarged sectional view of Figure 17 which illustrates a typical telescoped joint. The only remaining joints are where the end closure panels overlap at 66 and 67 (Figs. 10–13) and where the end closure panels seat in recesses 59 and 63. Suitable resilient gaskets (not shown, but similar to gasket 100) are secured in these places to one or the other of the mating parts so that a compressed seal will be provided when the longitudinal tension bars are tightened.

In order to facilitate erection of the shelter, and in order to further increase its rigidity if so desired, knee braces 104 and 105 (Fig. 2) may be employed. These knee braces are prefabricated of sheet aluminum to the triangular configuration shown in Figures 7 to 9. All of the knee braces are of the same construction, it being obvious that brace 104 is identical to brace 103 but is rotated 90 degrees. Each brace is fabricated from a single sheet of aluminum. It has a pair of channel sections 107 and 107a at right angles to each other and so dimensioned as to have a relatively snug fit over two intersecting projections 62 of a top panel and a side panel when a section is erected. The channel sections are connected by an integral web 108 that terminates at the hypotenuse of the triangle in a stiffening channel 109. The channel 109 is welded at its ends to the intersecting portions of sections 107 and 107a. Preferably the brace is cut away at its apex as indicated at 110.

Since a single section of the shelter has nothing to hold it erected until it is telescoped with another section, that section as well as the section to be telescoped with it must be held in erected condition until the two are engaged so that they hold each other erected. This does not necessarily make the erection difficult but it does require more time and men to hold a section erected while moving it into telescoped engagement than if some means are used to keep it erected during such movement. The knee braces 103 and 104 serve well for that purpose. Once a section is erected a pair of knee braces are slipped over the projection 62 at the two upper corners and the section is thereby held in erected condition. If it was the first section erected it can then be left unattended while the next section is erected, braced, and then brought over for engagement with the first section. The braces may be removed from the first section before the two sections are placed in telescopic engagement, or they may be left in place to furnish additional rigidity to the shelter. The material of which they are formed is thin enough so that there is no interference with the telescopic engagement of a projection 62 into a recess 63. Knee braces may thus be left at all of the joints between sections but there is no brace used on the last erected section because it does not have anything corresponding to projection 62 for the knee braces to be slipped over.

By reason of the fact that the erected shelter is rectangular in cross section the combined length of any two adjacent hinged panels will always equal the length of the remaining two sections, and the section can always be collapsed to a flattened condition for shipping or the like. In the embodiment of Figures 1 to 6 where the top and bottom panels are say 8 feet long they have sufficient rigidity to support large snow loads or the like. Figure 16 illustrates a shelter where with the side walls 111 eight feet high the top panel 112 is approximately 16 feet long. Panel widths are advantageously 4 feet, as in Figure 1 since that is a convenient size for handling and erection. With a 16 foot top as in in Figure 16 snow loads may be so large as to cause a sag of the top panel. To prevent such sagging a continuous brace or truss 113 may be employed, stretching from one side wall to the other. Preferably this brace 113 is constructed similarly to the triangular brace of Figure 7 in that it has channel sections 114, 115 and 116 that have a snug fit over the continuous projection or male connection 117. The workmen are thereby enabled to use it to hold a section in erected condition by placing the truss over the projection in the same manner as when using the smaller knee braces. The web 118 stretches from side wall to side wall and may be provided with holes such as 119 to lighten it. The bottom edge of the web is strengthened since it will be subjected to substantial tension if the top panel 112 has a large external load. If the bottom edge is slightly arched as in Figure 16 this strengthening may be advantageously accomplished by welding a rod 120 along its length, the rod also being welded at its ends to the bottoms of sections 114 and 116. If the bottom edge of the web is straight it may include an integral channel section such as the section 109 of the brace of Figure 7. If the shelter of Figure 16 is to be used where no roof loads are contemplated the brace or truss 113 can be omitted, and knee braces such as those of Figure 7 may be used if desired.

While the system of interlocking adjacent sections by means of the projections 62 and recesses 63 is preferred, it is emphasized that other interlocking configurations may be used, such as tongue and groove, or one such as shown in enlarged detail in Figure 18. Here the edge of one panel 121 is beveled in one direction as shown at 122 and the edge of the panel 123 is beveled in the other direction as shown at 124 so that it will have a mating engagement against the bevel 122. A partial telescoping engagement is thus provided, and any two erected sections will keep each other erected, this being one of the primary purposes of the interlocking of adjacent section edges. Weatherproofing resilient seals or gaskets 125 and 126 of rubber are secured in grooves in opposing portions of the panels, to serve the same function as the resilient seals 100 and 103 of Figure 17 and 101 and 102 of Figure 4.

Figures 19 to 23 illustrate a modified section that operates under the same principles as those previously disclosed, but wherein the panels forming a section and the connecting hinges are so constructed that the panels forming a section may be easily assembled and disassembled without any tools whatsoever. As shown in Figure 19 the edges of the panels, where they are hinged to adjoining panels, are beveled at complementary angles, preferably 45 degrees, instead of having a stepped engagement as shown in Figure 14. Diagonally opposite pairs of hinges are disposed so that one pair is inside the corners and the other pair is outside the corners, in accordance with previously described embodiments. Thus a section such as shown in Figure 19 can be erected to the rectangular vertical position shown in full lines, or collapsed to the horizontal position shown in dot-dash lines, and it can collapse only in one direction, as will be understood. With this form it is preferred, but not essential, that the edges of the panels facing the adjoining section be beveled so that adjoining section panels have an interfitting telescoping engagement as shown in Figure 18. Thus when a pair of sections are engaged they will hold each other against collapsing, as in the previously described embodiments. The outermost edges of the panels of the end sections are preferably similarly beveled inwardly to receive mating beveled end closures that will further assist in holding the sections erected, as will be understood.

Also shown in Figures 19 to 23 are novel forms of hinge construction that permit ready separation and assembly of the panels of a section. In Figure 19 the side panels of the section are indicated at 130 and 131 and the top and bottom panels at 132 and 133. Diagonally opposed external hinges are indicated generally at 134 and 135. Diagonally opposed internal hinges are indicated generally at 136 and 137. When the section is collapsed the panels 130, 131 and 132 have moved to the dot-dash positions indicated at 130a, 131a and 132a.

The internal hinges 136 and 137 are each composed of a hinge pin carrying section 140 (Fig. 22) carrying a hinge pin 143, and a hinge pin engaging section 142 (Fig. 23) carrying a series of hooks 141 that will slip over the exposed sections of the hinge pin. One part of an external hinge is indicated at 145 in Figure 20. This part carries a hinge pin 146 that has spaced exposed portions in a manner similar to the hinge pin 143 of Figure 22. The other part forming the external hinge is shown in Figure 21 at 147 and has a series of elongated hooks 148 that slip over the exposed portions of the hinge pin 146 when the section is in the collapsed condition shown in dot-dash lines in Figure 19. It will be apparent from Figs. 20 and 21 that panels 130 and 133 must be coplanar before the hooks 148 can be slipped over the hinge pin. Then when the panels are rotated until they are at right angles to each other, the hooks 148 cannot be disengaged from the hinge pin 146.

The panels forming a section may be easily assembled when these types of internal and external hinges are used. With panel 130 lying flat on the ground, panel 133 can be joined to it by slipping hooks 148 over the exposed sections of hinge pin 146. Next, panel 131 is laid upon panel 133 and shoved to the right so that the internal hinge 137 is assembled when pin 143 carried by panel 131 slips into the hooks 141 of the internal hinge element 142 carried by panel 133. In a similar manner the panel 132 is placed upon panel 130 and the elements of the internal hinge 136 are engaged. This should be done with the right hand end of panel 132 slightly raised from the position shown in dot-dash lines at 132a in Figure 19. Lastly, the right hand of panel 132 is lowered, and the hooks on its external hinge element will engage the hinge pin on the mating external hinge pin element carried by panel 131. Then while the section is being raised to the erected position of Figure 19 all of the mating hinge elements will be interlocked with each other so that the panels will not come apart. Disassembly is accomplished in reverse order, after the section is collapsed. With this system, the less bulky single panels can be carried to the erection site, and only a little time is used to engage the hinge elements before erection.

The prefabricated shelter made in accordance with my invention may be set up ready for occupancy in a very short time. When erected it is as substantial and rigid as any structure constructed in more conventional manner. While being transported in collapsed condition it does not take up any more room and in fact it probably takes up less room than would be required for the lumber required to make a shelter of the same size.

Figure 10:
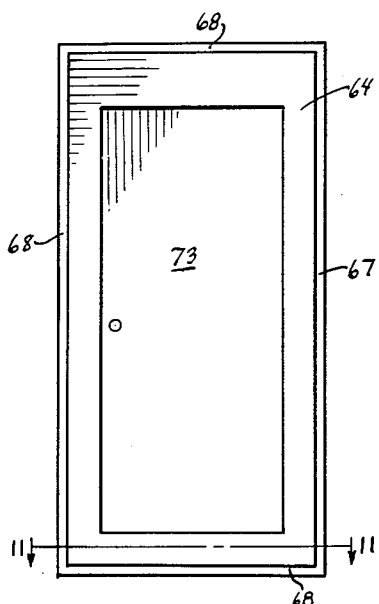
Figure 10 is a view in elevation of one of a pair of end panels that form the closure for one end of the building.
Figure 12:
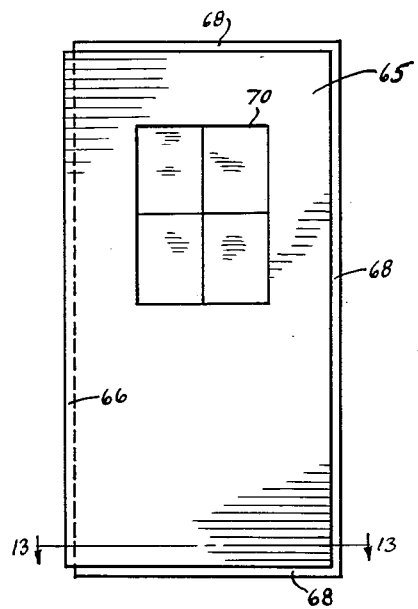
Figure 12 is a view in elevation of the other of the pair of end panels that form the closure for one end of the building.
Figure 11:
Figure 11 is a sectional view along line 11—11 of Figure 10.
Figure 13:
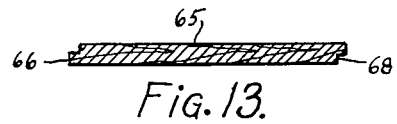
Figure 13 is a sectional view along line 13—13 of Figure 12.

Any reasonable number of sections may be combined to form a shelter. One section alone may be used to form a small shelter, in which case it would be one formed as is the left hand section 23 of Figure 1 so that it would have two recesses 59 and 63 (Fig. 6) to receive the panels forming the end closures. In this case, although there would not be a second interlocking section to maintain the first section rigidly erected, such rigidity would be provided by the end closure panels that fit into the recesses in the ends of the section panels. In the event that the shelter has widths of 12 or 16 feet, etc., instead of 8 feet, the end closure would be formed of a multiple of panels such as shown in Figure 12, plus one panel as shown in Figure 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the range of equivalency of the claims are therefore intended to be embraced therein.

The invention described herein may be manufactured and used by or for the Government of the United States of America for governmental purposes without the payment of any royalties thereon or therefor.

What is claimed and desired to be secured by United States Letters Patent is:

1. In a prefabricated building, a first collapsible section comprising a pair of oppositely disposed side panels of equal dimensions, top and bottom panels of equal width and length, hinge means connecting the top and bottom edges of each of said oppositely disposed side panels respectively to said top and bottom panels in such a manner as to allow the sections to be flattened into a parallel disposition by rotation of the side panels in a direction perpendicular to the side panels, cooperating means on the hinged edges of said panels preventing movement of said panels in the other direction beyond a perpendicular position with respect to each other, a second collapsible section of construction similar to said first section wherein the hinge means and cooperating means are effective to permit said section to be flattened only by rotation in a direction opposite to that of the first section and to prevent movement of the panels of said second section in the other direction beyond a perpendicular position with respect to each other, the sections having matching intermating means on the ends of adjacent sections and being placed on a surface with their bottom panels disposed side by side with the panels of each section in coaxial abutting intermating relationship, each section locking the adjacent sections against hinged movement since the matching intermating means on the ends of adjacent sections are mated together to hold the sections erect with their side panels perpendicular to the top and bottom panels.

2. A prefabricated building comprising two or more sections, each section having four panel members with stepped edges joined to each other by diagonally opposed external hinges and diagonally opposed internal hinges, said diagonally opposed external hinges associated with said stepped edges constraining folding of the section to one direction only, adjoining sections having the diagonally opposed external hinges placed on alternate edges of the panels so that alternate sections are constrained from collapsing in one direction and the other sections are constrained from collapsing in the opposite direction from its adjoining section, recesses and projections on alternate ends of the sections, said recesses and projections on corresponding ends of the sections intermating so that the sections stand erected locking the adjacent sections against hinged movement, the adjacent sections having been moved in opposite directions into an erected position and coaxially together, bar means along the outer edges of the panels holding the sections in erected position, sealing means between the stepped edges of the panels and the intermating ends of the sections, each of the diagonally opposed hinges being made of two pieces disengageable only when the sections are in the collapsed position, the top panels and the external hinge-adjoined side panels being in a flat, surface-contacting, superimposed relationship with the other side and bottom panels when said sections are moved into a collapsed position.

3. A prefabricated building comprising a series of sections having top, bottom, and opposed side panels hingedly connected at the panel edges permitting folding of the section from an erected rectangular configuration to a collapsed flattened configuration with a side panel and top panel overlying respectively the bottom and other side panel in parallel disposition, the bottom panels of the section being in side by side relationship, each of said sections erected in a rectangular configuration having matching intermating means on the ends of adjacent sections; means on alternate sections limiting relative movement of its side panels to ninety degrees in one direction from a collapsed to an erected configuration; means on the remaining sections limiting the relative movement of their side panels to ninety degrees in a second and opposite direction from a collapsed to an erected configuration, each section locking the adjacent sections against hinged movement since the matching intermating means on the ends of the adjacent sections are mated together, and bracing means connecting the top and side panels of at least some of the sections to maintain the respective sections in rectangular erected configuration and to strengthen the top panel against sagging due to external loads.

4. A prefabricated building comprising a series of sections having top, bottom, and opposed side panels hingedly connected at the panel edges permitting folding of the section from an erected rectangular configuration to a collapsed flattened configuration with a side panel and top panel overlying respectively the bottom and other side panel in parallel disposition; means on alternate sections limiting relative movement of its side panels to ninety degrees in one direction from a collapsed to an erected configuration; the bottom panels of the collapsed sections being in side by side relationship; intermating means on the outer ends of adjacent sections maintaining adjacent panels of the sections in coplanar alignment, each section locking the adjacent sections against hinged movement since the adjacent sections are in intermated engagement; closure panels engaging the open ends of the end sections of the series completing the enclosure; and bar means maintaining said sections in assembled relationship, said last means also maintaining said closure panels in position in the end sections of the series.

References Cited in the file of this patent

UNITED STATES PATENTS

| | | |
|---|---|---|
| 161,673 | Dutton | Apr. 6, 1875 |
| 414,976 | Harvey | Nov. 12, 1889 |
| 670,840 | Clarke | Mar. 26, 1901 |
| 2,575,593 | Peery | Nov. 20, 1951 |
| 2,598,983 | Ellis | June 3, 1952 |

FOREIGN PATENTS

| | | |
|---|---|---|
| 362,818 | France | of 1906 |
| 479,761 | France | Feb. 12, 1916 |
| 142,128 | Great Britain | of 1921 |
| 532,876 | France | of 1922 |